US008566310B2

(12) United States Patent
Aslam et al.

(10) Patent No.: US 8,566,310 B2
(45) Date of Patent: Oct. 22, 2013

(54) SYSTEM AND METHOD FOR TWO-WAY DATA FILTERING

(76) Inventors: Nazish Aslam, Edinburgh (GB); Mark Muir, Edinburgh (GB)

(*) Notice: Subject to any disclaimer, the term of this patent is extended or adjusted under 35 U.S.C. 154(b) by 0 days.

(21) Appl. No.: 13/072,729

(22) Filed: Mar. 27, 2011

(65) Prior Publication Data
US 2011/0238697 A1 Sep. 29, 2011

Related U.S. Application Data

(60) Provisional application No. 61/317,743, filed on Mar. 26, 2010.

(51) Int. Cl.
*G06F 7/00* (2006.01)
*G06F 17/30* (2006.01)

(52) U.S. Cl.
CPC . *G06F 7/00* (2013.01); *G06F 17/30* (2013.01)
USPC .......... 707/732; 707/733; 707/758; 707/769; 707/770

(58) Field of Classification Search
None
See application file for complete search history.

(56) References Cited

U.S. PATENT DOCUMENTS

| | | | | |
|---|---|---|---|---|
| 2001/0049636 A1* | 12/2001 | Hudda et al. | | 705/26 |
| 2005/0038876 A1* | 2/2005 | Chaudhuri | | 709/219 |
| 2006/0253291 A1* | 11/2006 | Ishigai et al. | | 705/1 |
| 2008/0010598 A1 | 1/2008 | Smilowitz et al. | | |
| 2008/0064326 A1* | 3/2008 | Foster et al. | | 455/3.06 |
| 2008/0091518 A1* | 4/2008 | Eisenson et al. | | 705/10 |
| 2008/0091535 A1* | 4/2008 | Heiser et al. | | 705/14 |
| 2008/0167957 A1* | 7/2008 | Steelberg et al. | | 705/14 |
| 2009/0025034 A1* | 1/2009 | Modiri et al. | | 725/43 |
| 2009/0203361 A1* | 8/2009 | Huang et al. | | 455/414.1 |
| 2010/0036718 A1* | 2/2010 | Hamilton et al. | | 705/14.4 |
| 2011/0313840 A1* | 12/2011 | Mason et al. | | 705/14.35 |

FOREIGN PATENT DOCUMENTS

GB 2379616 A 3/2008

* cited by examiner

*Primary Examiner* — Jay Morrison
(74) *Attorney, Agent, or Firm* — Steven M. War, Esq.

(57) ABSTRACT

The addition of a two-way filter to computer networks, such as the Internet, uses both the criteria of the information producer (or product/service provider) and the criteria of the information consumer (or customer) to specifically target consumers with useful information or special offers on products or services they need during a specific time frame or time frames. Two-way filtering also permits customers or information consumers to quickly identify available products or services or information they are specifically interested in without requiring the customer to review hundreds, if not thousands, of sources, since the returned results have been heavily filtered. Two-way filtering is particularly important when it is used to match the service area the service provider is working in during a particular day (or a particular period of time) with customers in that service area that may need the services of the service provider.

18 Claims, 11 Drawing Sheets

SYSTEM AND METHOD FOR TWO-WAY DATA FILTERING

CROSS REFERENCE TO RELATED APPLICATIONS

The present application claims priority to Provisional Patent Application No. 61/317,743, filed Mar. 26, 2010 entitled "2-Way Filtering" which is incorporated herein in its entirety, and the benefit of the earner Mar. 26, 2010 filing date is claimed in accordance with 35 U.S.C. §119 (e)(1).

TECHNICAL FIELD

The present invention generally relates to dynamic two-way data filtering on networked computers, such as the Internet, and on mobile device applications.

BACKGROUND OF THE INVENTION

Today, computer users, and especially Internet users, are very familiar with performing searches to locate information on a particular topic which may be of interest to the individual performing the search. For example, at the time this application was drafted, performing a search on Google™ for the term "gardener" results in the identification of 12,500,000 websites which contain the term "gardener" in less than one quarter of a second. While the identification of 12,500,000 websites in less than a quarter second is impressive, it does not help the individual locate the handful of websites which would be of most interest to the searcher. The top search results currently show a Wikipedia article defining a gardener, some articles on professional gardener's guides, some news articles containing the word gardener and some sponsored links from companies who either directly offer that service or from an intermediate directory service through which you can locate gardeners. Rather, the searcher is faced with the daunting task of wading through the 12,500,000 resulting websites in an effort to identify the websites most relevant to the searcher's interests. Narrowing the search term would seem an obvious way to resolve the unwieldy number of "hits," performing a search on the term "gardeners in Edinburgh" results in the identification of 1,150,000 websites. Alternatively, searching the Internet for the terms "gardeners in Edinburgh special offer for today" results in the identification of 1,370,000 results. Given the amount of information available on the Internet today, it is difficult, if not impossible, to efficiently identify the most relevant information on a given topic. As search engines are used to help perform searches of any arbitrary topic, such search engines give higher promotion of heavily linked-to websites in natural search results compared to those of fewer links as one way to determine quality and relevance of results. This results in websites of global significance (such as encyclopedia entries) "drowning out" the visibility of the websites of local small business providers.

Sponsored links improve the quality of the search in this instance (where a searcher is looking for a service), by reserving an area in the results for items relating only to service providers. However the downside is that these sponsored links typically apply to the scale of an entire country so companies who can afford to advertise to that size of the market dominate these results.

For the searcher, the latest web search engines are now able to prioritize results from service providers that are in a similar location to the end-user. This improves the experience for the searcher, but still requires the service provider to pay for exposure to people whom he/she may be unlikely to serve (either based on geographic distance, or merely because the service, provider is really only affordable by those from more well-off areas with higher disposable incomes within a given city) since they can still appear in search results for searchers that are far away from the specific areas the service provider is able to serve on any given specific days due to the service providers location for the days. Since cost is based on exposure, false hits by irrelevant searchers may quickly eat up the maximum page views that smaller companies can afford, thus making them disappear from results, which again leads to the searcher's results being dominated by the larger businesses or irrelevant information.

On the other hand, where the searcher is able to perform a restriction of results by distance, this unfairly penalizes online businesses, for example, who may be located a far distance away but can equally provide the searcher with desired products or services through theft extensive distribution channels on the ground.

Furthermore, searches performed on search engines such as Google™ can be considered "one-way data filters" or "searches," meaning that the information desired is filtered (narrowed, or searched) from a single direction, typically from the searcher's (or the "information consumer's") perspective.

Other applications, such as computer dating programs, may implement a one-way data filter, or a specific form of two-way data filter. For example, a computer dating program which implements a one-way data filter may require its members to provide profile information on themselves in order to create a database of its members. This profile information may include, name, address, picture, gender, age, likes, dislikes, interests in having children, religious affiliations, and similar information. If the computer dating program uses a one-way data filter, its members may be permitted to search the database for individuals who meet the criteria the searching member specified, but the criteria of the non-searching member would be ignored. Conversely, if the computer data program used a two-way data filter, the criteria indicated by both the searching member and the non-searching member would be considered. One-way data filters and two-way data filters are briefly described in U.S. Patent Publication No. US 2008/0010598 published on Jan. 10, 2008.

For example, suppose Mike, is a member of a dating service and wishes to use its computer dating program to meet women with similar interests to his. Mike is a 24 year old man who lives in Washington, D.C., and enjoys rock climbing, hiking, fishing, snow skiing and visiting museums. He is interested in meeting women between the ages of 20 and 25 that live in the Washington, D.C. area who also enjoy hiking or snow skiing. Suppose further, that during the same timeframe, both Pam and Mary, are members of the same dating service and wish to use its computer dating program to meet men with similar interests to theirs. Pam is a 25 year old woman who lives in Alexandria, Va., and enjoys hiking, dining out, and parachuting. Pam is interested in meeting men between the ages of 20 and 30 that live in the Washington, D.C. area who enjoy hiking or dining out. Mary is a 24 year old women who lives in Washington D.C. and enjoys snow skiing. However, Mary is only interested in meeting men between the ages of 27 and 35. If the computer dating program utilized a one-way data filter, Mike could use the program to identify women that meet only his desired criteria. If Mike used a one-way data filter to search the database for women between the ages of 20 and 25 that live in the Washington D.C. area who also enjoy hiking or snow skiing, the resulting list would include the names of both Pam and Mary, even though Mike does not meet the criteria specified by Mary.

However, if the computer dating program used a "two-way data filter" it would consider the criteria expressed by both the searcher (again Mike) and the women included in the database. If the computer dating program utilized a two-way data filter, Mike could use the program to identify women that meet his desired criteria and the resulting list would only include the women for which Mike also met the women's desired criteria. If Mike used a two-way data filter to search the database for women between the ages of 20 and 25 that live in the Washington D.C. area who also enjoy hiking or snow skiing, the resulting list would include Pam's name, but not Mary's name. Pam's name would be included because Mike meets the criteria specified by Pam, i.e., men between the ages of 20 and 30 that live in the Washington, D.C. area who enjoy hiking or dining out. Mary's name would not be included because Mike does not meet the criteria specified by Mary (i.e., Mike is 24, and Mary desires to meet men only between the ages of 27 and 35).

Such two way filters attempt to match together two instances of the same type of record (a personal profile). In such cases, a simple key lookup (i.e., comparing the corresponding field or fields in two entries) and field matching is performed, which is the common method used in database queries to perform such forms of 2-way data filtering.

SUMMARY OF THE INVENTION

One embodiment of the invention includes a method of presenting relevant information to an information consumer comprising a number of steps. These steps include: determining the information to broadcast; determining at least one instance of any location concept to represent a target coverage area; determining a duration for the information broadcast; determining what periods of time the actual information applies to; saving the information to a database; determining a location for the information consumer; determining a search area of interest; determining a time range of interest; determining search query terms; matching by the processor together the information consumer's location with the locations of the available information entries held in a database; matching by the processor together the times of interest of the information consumer against the time ranges of information broadcast; and displaying information from said database to the information consumer as a result of said matches between locations and matches between times of interest.

Another embodiment of the invention includes a method of matching together two location concepts which includes a number of steps. These steps include: determining by a processor the two locations to match; determining by the processor which location concepts are being used to represent each of these locations; invoking different logic depending on how the locations are expressed to check for potential matches wherein said different logic is selected from the group consisting of: checking by the processor two locations expressed as points directly against each other to see if each location is within the vicinity of the other; checking by the processor a location expressed as a point against another expressed as an area by identifying whether the point-based location is within the area-based location's outline boundary; and checking by the processor two locations which are both expressed as areas to see if one location reasonably encompasses the other location's area.

Another embodiment of the invention includes a system to perform two-way filtering of data, where the system includes: a frontend view permitting an information consumer to search for information of interest; a frontend view permitting an information producer to provide broadcast information to broadcast; a backend to match the request of information received from the information consumer with the relevant information provided by the information producers; and a database for recording information provided by the information producer; wherein the backend provides information pertaining to the information producer to the information consumer in response to at least one match.

BRIEF DESCRIPTION OF THE DRAWINGS

The drawings are meant to illustrate the principles of the invention and do not limit the scope of the invention. The above-mentioned features and objects of the present disclosure will become more apparent with reference to the following description taken in conjunction with the accompanying drawings wherein like, reference numerals denote like elements in which.

DETAILED DESCRIPTION OF THE INVENTION

Figure 1:
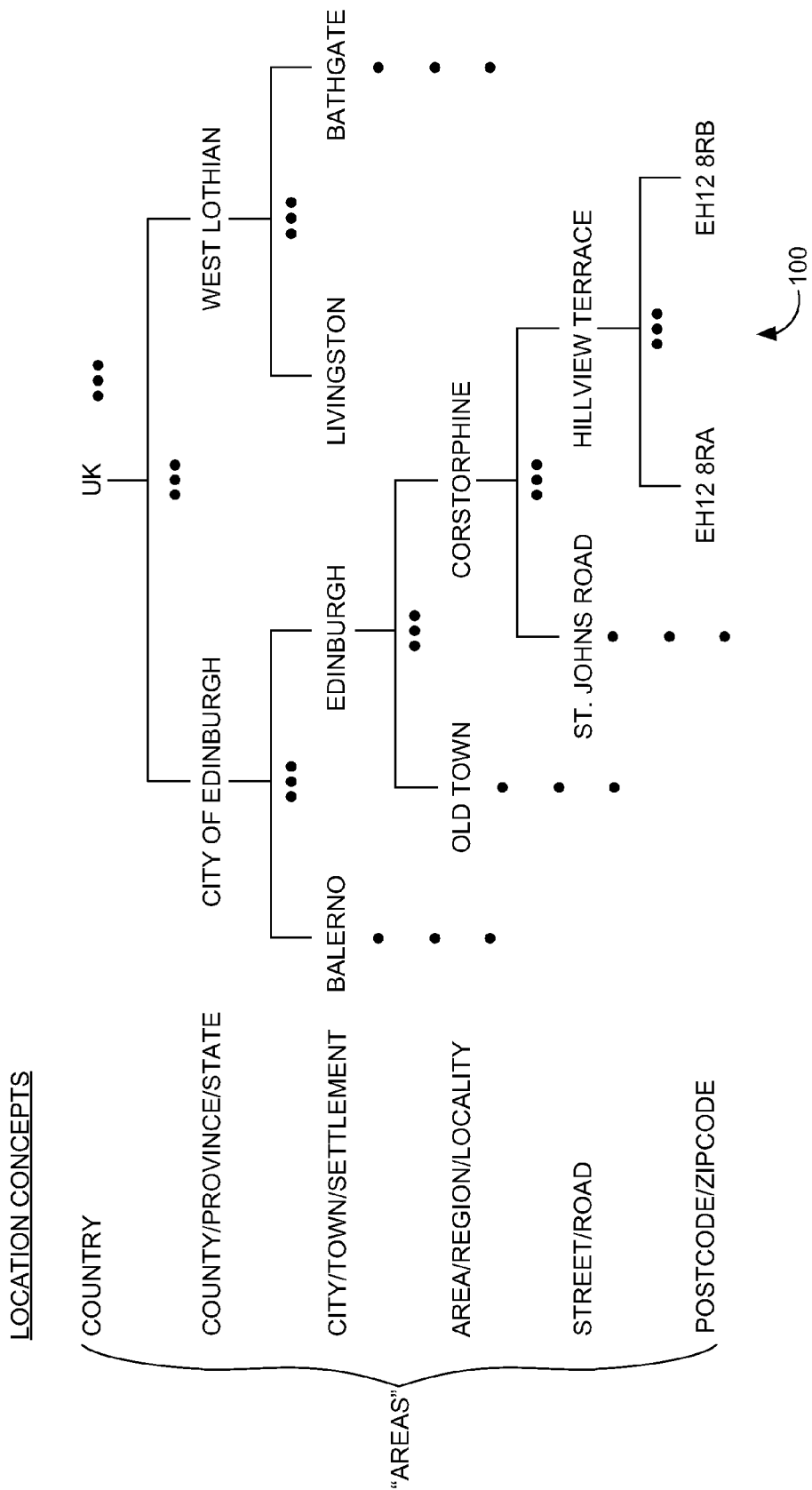
FIG. 1 shows a location hierarchy including possible location concepts and the corresponding physical entities.

Reference will now be made in detail to the exemplary embodiments of the present disclosure, examples of which are illustrated in the accompanying drawings, wherein like reference numerals refer to like elements throughout. The embodiments are described below so as to explain the present disclosure by referring to the figures. Repetitive description with respect to like, elements of different exemplary embodiments may be omitted for the convenience of clarity.

The use of two-way filtering allows for a significantly more controlled environment, where the results presented through the use of two-way filtering are much more targeted and relevant. "Two way" implies filtering of information applied from both the information producer's (IP) perspective as well as the information consumer's (IC) perspective. Examples of information producers include, but are not limited to, service providers such as gardeners, painters, computer repairmen, cable television installers, and house cleaning services, as well as retail outlets, supermarkets, small shops and local authorities. Examples of information consumers include, but are not limited to, homeowners or businesses that are in need of the services offered by service providers. Two-way filtering presented in this invention is of particular value when the selection criteria includes geographical location (or areas) and may include time ranges.

For example, suppose a gardener (or another service provider) has a number of jobs scheduled for a particular day, within a particular region of the city. However, his schedule for that day is not full, and he has free time between these scheduled jobs in which he could perform additional, i.e., not yet scheduled, jobs in that region of the city. Since he has time available to perform additional jobs, he wishes to advertise that he will be in this particular region of the city on this particular day and between specific times and would be able to provide a discount to any new jobs that could be performed during these periods of free time in this particular region of the city. Alternatively, the discount could be in the form of a reduced service call fee (i.e., the initial fee for coming to the information consumer's residence) or, the service call fee may be reduced by being evenly split between each information consumer serviced that day in that region of the city by the information producer. In this case the information that is being distributed consists of the information concerning the information producer and its services, the possible discount on jobs or on the service call fee, and the date and/or time range the information producer will be in the geographic area. The gardener (the information producer) wishes to specify that this offer is valid for just a few hours on that particular day (i.e., a time filter), and is only available to people within that area (i.e., a geographical location filter). People looking for a gardener (i.e., information consumers) wish to see only offers that are available to them (meaning in this example in the area of the city the gardener will be in) and that they can make use of. A particular user (or information consumer) needs a gardener today, to tend to their house's garden. They therefore enter simple search criteria for gardeners and their location (i.e., a geographical location filter), and only those available today (i.e., a time filter). The combination of filters given here will allow the user to see the gardener's offer only if the locations and time ranges overlap. This drastically improves the relevancy of the user's search results. Note that the information consumer need not try to guess any distance for their search—they will automatically only be shown results from information producers who are able to serve them. The distance of the service provider's own position is completely irrelevant for the information consumer to worry about in this scenario.

As further explained below, at the time of information construction, the information producer may specify who the intended recipients should be, by means of filter terms relating to geographical location, consumer IDs, consumer types (e.g., pensioners, students, youngsters, males, etc) and/or further typical demographic characteristics such as disposable income. The information may include, additional meta-data associated with it, such as a time range over which it is valid, and keywords. This may be recorded in a database or equivalent.

Information consumers (or users) would initiate searches by querying the applicable database or a service provider network. The query would combine both producer-side and consumer-side filters, operating on meta-data associated with the information as well as meta-data provided by the consumer (e.g., theft location, filter terms such as their query of interest and some other form of demographic data such as theft disposable income). Such demographics data may either be manually entered by the information consumer or automatically derived from a database if the information consumer has provided their consumer ID to the system, or alternatively it may be derived from third party sources which are able to associate locations with various income bands, etc. Only those results passing through both filters will be shown to the information consumer.

Information provided by an information producer may or may not have a location associated with the information. That is, although the information producer may make a judgment (either manually or through an automated system) on who they target their information to, they need not specify or associate a location with their announcement. For example, information given by a service provider such as a gardener, may only say who the target information consumer should be, but not what his/her own current location is, where his/her location will be at any time in future or where his/her business address is registered, since this information is largely irrelevant in such a situation—the gardener would have to travel to the information consumer's location to deliver his/her services, regardless.

On the other hand, for a service provider such as a local public library, it would be desirable for the service provider to associate a location (the library premises) with most of their announcements as the information distributed by the library is directly applicable to that premises only and the information consumer would have to travel to the premises to make use of some of the announcements such as the arrival of new books.

Similarly an information producer such as a shop may specify its own premises location for any announcements they make, such as limited stock special offer announcements, whereas an event's organizer type business may specify a different location for each of their announcements in which they are raising awareness for events being run at different venues.

Furthermore, a mobile business, such as an ice-cream or snacks van, which is on the move may associate a frequently changing location with theft announcements, e.g., 500 meters radius from their current location, where ever they happen to be.

Table 1 illustrates the system's capabilities in one embodiment of performing the following 2-way geographical filtering for each information entry (assuming no other filters are in effect, for simplicity):

TABLE 1

| Position for information (provided by IP) | IP's target area overlaps the IC's position | IC's search area overlaps the information position | IP target area and IC search area overlap | Pass geographic filter for IC to see Information? |
|---|---|---|---|---|
| None | Yes | — | Yes | Yes |
| None | Yes | — | No | No |
| None | No | — | Yes | No |
| None | No | — | No | No |
| Given* | Yes | Yes | — | Yes |
| Given* | Yes | No | — | No |

TABLE 1-continued

| Position for information (provided by IP) | IP's target area overlaps the IC's position | IC's search area overlaps the information position | IP target area and IC search area overlap | Pass geographic filter for IC to see Information? |
|---|---|---|---|---|
| Given* | No | Yes | — | No |
| Given* | No | No | — | No |

*E.g., postcode/zip code, street name, IP address or GPS coordinates (or some other form of reference coordinates given such as a grid reference). This position for information may be static (i.e., fixed position for the duration of the announcement being broadcast) or dynamic (i,e., moving position to reflect movements of a mobile business).

Further filtering may be applied to the above filtered results, or further filtering may be embedded within the same filter, for additional checks for things such as consumer IDs and/or consumer types. That is, the information producer may additionally specify consumer IDs and/or consumer types to target within the specified target geographic coverage area. The matching information consumers may be identified from direct input from the information consumer or from fetching previously recorded data about the information consumer from a database, or by automatically determining the consumer type or ID based on their location, for example.

The information consumer's physical location may be auto-detected using HTML 5's geolocation API (or by other means such as Internet Protocol address), or entered manually (e.g., by entering a postcode/ZIP code, or a recognized street/area/city/region name or names). In addition, the information consumer may be provided with a manual override, so that an alternative virtual location for the services can be set in order to see information relevant to that targeted location.

Table 2 enumerates possible implied meanings of an information consumer's or an announcement's location, specified in terms of each level of the location hierarchy in an embodiment of the invention:

TABLE 2

| Location Concept/ Level in Hierarchy | Location Meaning/Interpretation |
|---|---|
| Co-ordinates | At the specified position, |
| Postcode/ZIP code | Somewhere/anywhere within the boundary of the given postal unit. |
| Street/Road | Somewhere/anywhere within the boundary of the given street or its constituent postal units. |
| Locality | Somewhere/anywhere within the boundary of the given locality or its constituent streets. |
| Settlement | Somewhere/anywhere within the boundary of the given settlement or its constituent localities, streets, or postal units. |
| Region/County/State | Somewhere/anywhere within the boundary of the given region or its constituent settlements, localities, streets, or postal units. |
| Country | Somewhere/anywhere within the boundary of the given country or its constituent regions, settlements, localities, streets, or postal units. |

These location concepts broadly come under two classes: points and areas. 'Points' may be expressed using coordinates belonging to any form of grid, e.g., GPS co-ordinates (longitude/latitude), and refer to a specific point in space. While 'areas' may be expressed in terms of items in a location hierarchy, where each level represents an arbitrary region of space, e.g., postcode/ZIP code, street/road name, locality/area, settlement/town, region/state/province.

FIG. 1 illustrates one potential representation of such a hierarchy 100. For example, as shown in FIG. 1, an instance of a country may be the UK; selections for county/province/state may be City of Endinburgh, West Lothian; selections for city/town/settlement may be Balerno, Edinburgh, Livingston, and Bathgate. One of ordinary skill in the art would also appreciate the relationships between the various location concepts or areas. Other representations may remove levels from the hierarchy, introduce extra levels, vary the combination of location concepts at each level, or create new concepts/polygons to describe different types of groupings of geographical locations, etc.

Each item in each level of the 'area' location hierarchy may encompass one or more items from any levels below (e.g., a settlement can be defined in terms of localities within it, in addition to some outlying streets and ZIP codes). Each area may be defined by a polygon inside which any point is considered to lie within that area. The polygon for areas at the lowest level of the hierarchy (postcode/ZIP code) may be stored directly against that area in the database. The polygons for areas at higher levels of the hierarchy may be derived by the union of the polygons of its constituent area items from lower levels in the hierarchy. Such a union polygon may be calculated as the outline of all the vertices from each constituent polygon. The union polygon therefore may be a superset of the constituent areas, so it is useful only as an approximation for more efficient hit testing between points and that item.

Relationships between items in the area location hierarchy may be stored in a database using tables: each table may express a one-to-many ownership relationship between two given levels of the hierarchy. For each level of the hierarchy, an ownership relationship may exist between that level and every level below. Additionally, the union polygon for higher-level items in the location hierarchy may be stored against that item, as a cache for use in frequent hit testing.

Figure 2A:
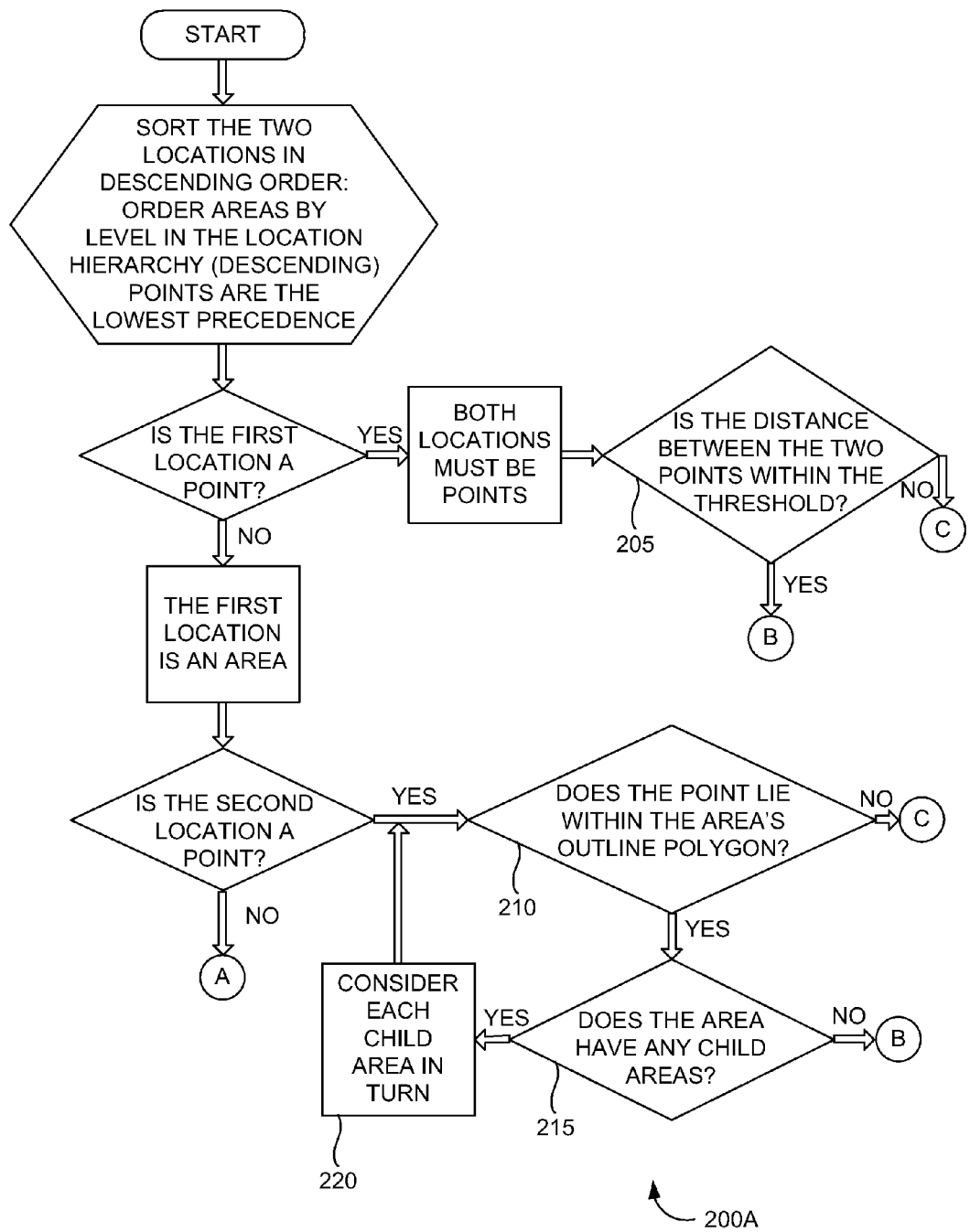
FIGS. 2A and 2B show a representative location matching block diagram.
Figure 2B:
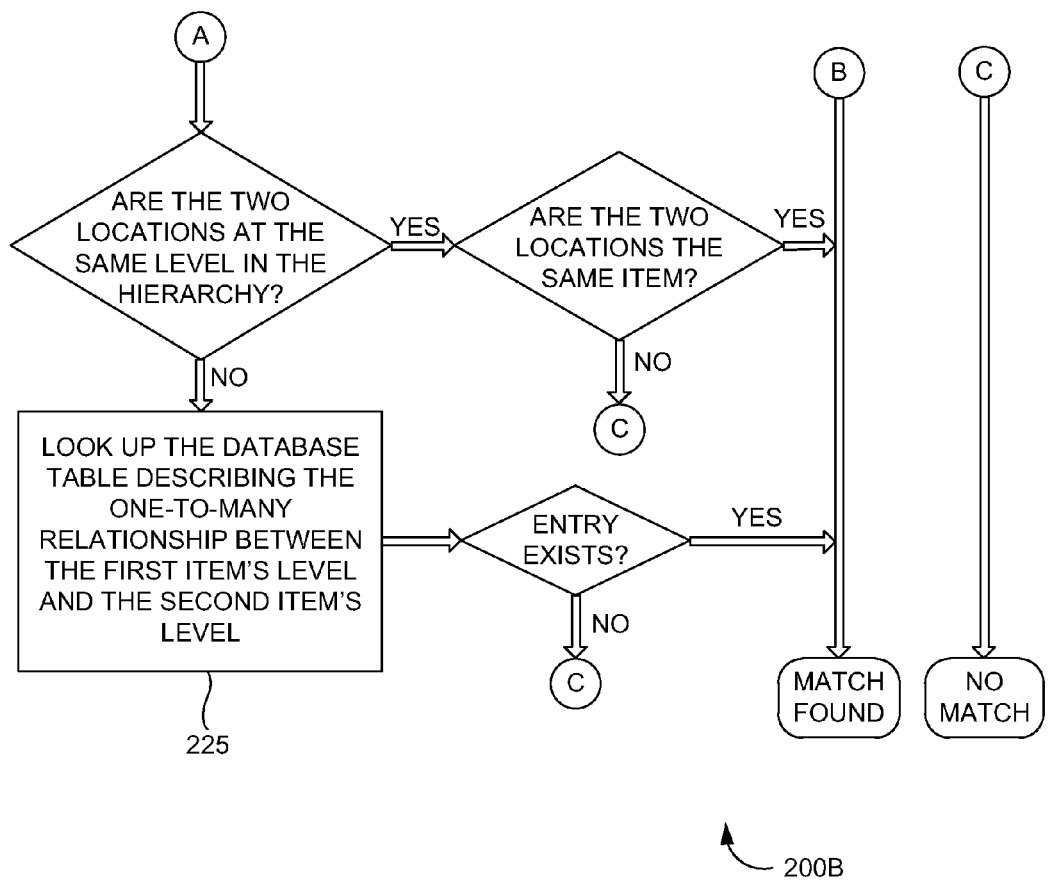

FIGS. 2A and 2B show one possible implementation 200 of an algorithm used to perform location matching, where the locations may be expressed in different ways. Broadly, this leads to either a comparison of two points, a comparison of two areas, or a comparison of a point and an area. Hit testing is a commutative operation, so to reduce the number of cases to compare, the two locations are sorted so that the first location is at a higher level than the second location. For the purpose of defining an order, points are considered to be part of the location concept hierarchy described above, but at a level below any real level in that hierarchy.

For two points, they may be compared by proximity, either by direct equality of the coordinates, or with some proximity threshold (so that similar points are considered equal) (Step 205).

For a point and an area comparison, they may be tested for whether the coordinates of the point lie within the area. The lowest-level nodes in the location hierarchy (leaf nodes) contain the most accurate outline polygons. Therefore, to get the most accurate hit test, the point must be checked for lying within the outline polygon of any (i.e. at least one) of the leaf nodes below the given area. The hit test between a point and a leaf node's outline polygon can be done by checking whether the specified point lies to the left of all edges of the outline polygon, when the outline's vertices are traversed in an anti-clockwise winding order (or through any other suitable means).

High-level area concepts can have a very large number of leaf nodes below them, leading to a large search space. In order to improve efficiency, the search space can be reduced by caching equivalent outline polygons for areas that are not leaf nodes. Steps 210 and 215 capture the recursive process of using cached high-level outline polygons to descend down the location hierarchy, arriving at a matching leaf node (if one exists). Beginning with the original test area, a set of areas are tested for the point lying within their corresponding outline polygon. If no match is found for any member of that set (step 210), no match exists between the point and original test area. Otherwise, the set is replaced by the child areas of the matching members in the current set (step 215). If no child areas exist, then a match between the point and original test area has been found.

On the other hand, if two areas are compared, this may be done by traversing the location hierarchy tree, identifying whether an ownership relationship exists between the two. Note that in such a scenario the outlines need not be compared. Ownership testing between areas may be done using a different database query depending on which level in the location hierarchy the first area belongs to. This may simply involve looking up each one-to-many ownership relationship table (Step 225) in the database for entries involving the first area, looking for any appearance of the second area.

Table 3 enumerates possible implied meanings of an information producer's target coverage area or an information consumer's search area, specified in terms of each level of the location hierarchy in an embodiment of the invention:

TABLE 3

| Location Concept/ Level in Hierarchy | Target Coverage Meaning/Interpretation |
| --- | --- |
| Co-ordinates | N/A |
| Postcode/ZIP code | Applies to everything within the boundary of the given postal unit. |
| Street/Road | Applies to everything within the boundary of the given street or its constituent postal units. |
| Locality | Applies to everything within the boundary of the given locality or its constituent streets. |
| Settlement | Applies to everything within the boundary of the given settlement or its constituent localities, streets, or postal units. |
| Region/County/State | Applies to everything within the boundary of the given region or its constituent settlements, localities, streets, or postal units. |
| Country | Applies to everything within the boundary of the given country or its constituent regions, settlements, localities, streets, or postal units. |

Additionally, as shown in Table 4, target area coverage/search area may be specified using a location concept plus a radius, to define a circle, or an approximated polygon in embodiments of the invention:

TABLE 4

| Location Concept/Level in Hierarchy | Target Coverage Yearling/interpretation |
| --- | --- |
| Co-ordinates + radius | Applies to everything completely enclosed by a circle of the given radius centered at the specified co-ordinates. |
| Postal unit + radius | Applies to everything completely enclosed by a circle of the given radius centered at boundary centroid of the given postal unit. |
| Street + radius | Applies to everything completely enclosed by a circle of the given radius centered at boundary centroid of the given street. |
| Locality + radius | Applies to everything completely enclosed by a circle of the given radius centered at boundary centroid of the given locality. |
| Settlement + radius | Applies to everything completely enclosed by a circle of the given radius centered at boundary centroid of the given settlement. |
| Region + radius | Applies to everything completely enclosed by a circle of the given radius centered at boundary centroid of the given region. |

TABLE 4-continued

| Location Concept/Level in Hierarchy | Target Coverage Yearling/interpretation |
| --- | --- |
| Country + radius | Applies to everything completely enclosed by a circle of the given radius centered at boundary centroid of the given country. |

A circular target coverage area specified by an information producer and tested against a position given by an information consumer and expressed using a higher-level (i.e., vague/lower precision) location concept may only constitute a match or "hit" if the target coverage's circle completely contains the boundary of the item used to express the position of the information consumer—an overlap alone, is not sufficient. If, for example, the information producer has to pay based on the expanse of the target coverage area, a test for just an overlap may avow the information to be visible, to people outside the originally selected target coverage. For example, assume that a shop wants to advertise (i.e., make an announcement/broadcast information) to everyone within 1 kilometer radius of theft shop premises. An information consumer expresses their position in terms of a city name (the same city as the shop) and enters a search query that could match the shop's announcement. Testing for "hits" based on just an overlap may allow the information consumer to see the shop's announcement, even if the information consumer's exact position lies outside, the 1 kilometer radius of target coverage geographical filter set by the shop. This therefore could violate the intent of the target coverage 2-way geographical filtering concept.

The target coverage area and search area represented by Tables 3 and 4 may be visualized as polygons or circles overlaid on to a map of the corresponding geographic area, to help determine the extent of the area coverage. A map such as the Google Maps may be used for such purposes which already provides an interface to allow developers to input the vertices for rendering arbitrary shapes over theft maps. Where appropriate, the polygons may be approximated to ease the computation, the shape rendering speed and memory storage requirements. One way of such approximation would be to always render any shaped polygon by a convex shaped polygon equivalent constructed with fewer vertices using any standard convex hull algorithm.

Figure 3:
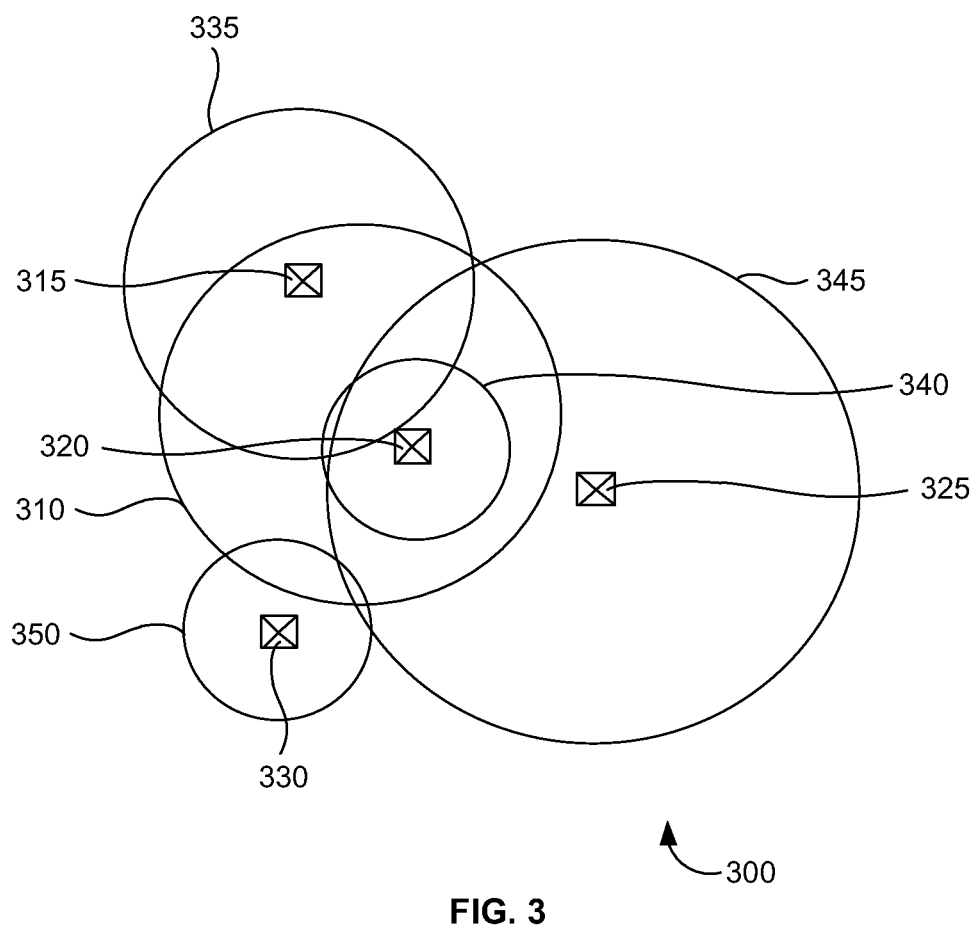
FIG. 3 is a mapping diagram of one embodiment of the present invention illustrating potential overlaps between the criteria specified by an information producer and various potential information consumers.

FIG. 3 is a mapping diagram 300 of one embodiment of the present invention illustrating potential overlaps between the criteria specified by an information producer and various potential information consumers. In this case the Information Producer does not provide location information. The Information Producer ("IP"), such as a gardener, is planning on being at a specific position today and decides to inform all information consumers ("IC") in the nearby area of his/her presence in the area so to secure potential new business whilst there. As illustrated in FIG. 3, the service area 310 represents the target coverage region where the IP broadcasts the information and where it is considered visible (i.e., producer-side filtering). In other words, IP has one service call scheduled for the day and service area 310 is the geographical area in which IP is able to service other information consumers on the present day. IP's own current position or future location is not needed to be specified along with the announcement being broadcast as it is irrelevant additional information for the information consumer in this case.

The target coverage area 310 in FIG. 3 is not necessarily circular and may assume any shape as it may be specified in terms of one or more postcodes/zip codes, streets, localities, cities, regions, etc, or any combination thereof, and optionally combined with a radius—using the same or similar logic as described above. This target coverage area 310 may initially be specified by IP at the time of information construction and may be updated as required, for example, if no information consumers have been in touch for a while—an extended or alternative service area may be set in an attempt to improve visibility. The updates may occur manually by the IP or automated by the system.

FIG. 3 also shows four potential information consumers ("ICs"), IC 315, IC 320, IC 325, and IC 330, each of which may specifically be looking for a gardener. Surrounding each of these four potential ICs are the respective ICs' area or region of interest, 335, 340, 345 and 350 respectively. In other words, areas 335-350 represent the respective regions (search areas) ICs 315-330 want to explore in order to limit the number of results they see. Only IPs targeting a subset of those areas, or IPs who have given theft location and are within those areas, will be seen in the respective IC's search results.

Similarly, search areas 335, 340, 345, and 350 need not be circular in shape and may assume any shape. They may be specified in terms of one or more of postcodes/zip codes, postal sectors, postal districts, street names, area names, city names, etc, or any combination thereof, and optionally combined with a radius—using the same or similar logic as described above. Furthermore these search areas need not be in the immediate, vicinity of the respective IC either.

As shown in FIG. 3, ICs 315 and 320 are both located within area 310 (i.e., IP's target coverage area) while ICs 325 and 330 are both located outside area 310. Accordingly, information on IP will be presented to ICs 315 and 320 if ICs 315 and 320 are interested in having service performed today (i.e., the day IP will be in the area). Conversely, information on IP will not be presented to ICs 325 and 330 even if ICs 325 and 330 are interested in having service performed today. Since ICs 325 and 330 are outside region 310 targeted by IP, the information remains invisible to both ICs 325 and 330. In other words, neither IC 325 nor IC 330 is provided with information on IP.

This is true even though IP lies within region 345 specified by IC 320. In this specific example, IC 320 desires the services be performed on a future day, i.e., a day other than the one on which IP will be in the local area. Accordingly, IC 320 is not provided with IP's information even though IC 320 is boated within area 310. Again, IP's information is not presented to IC 320 because IC 320's time filter is set to only show information for a day which is different from the day in which IP will be in the geographic area. Accordingly, as a result of the application of the two-way data filter, only IC 315 receives information on IP. Table 5 summarizes the results of FIG. 3.

TABLE 5

|  | Located within IP's target area 310? | Overlap of target area 310 and IC's search area? | Meets 2-way geographical filter? | IP's timeframe | IC's timeframe | Meets 2-way timeframe filter? | Visible? |
| --- | --- | --- | --- | --- | --- | --- | --- |
| IC 315 | Yes | Yes | Yes | Today | Today | Yes | Yes |
| IC 320 | Yes | Yes | Yes | Today | Not today | No | No |
| IC 325 | No | Yes | No | Today | Today | Yes | No |
| IC 330 | No | Yes | No | Today | Today | Yes | No |

The system may additionally provide the IP further data on how many ICs' have performed searches that did "hit" the IP's information and those that could have matched the IP but did not due to too restrictive filtering criteria set by the IP or poor target coverage areas chosen, so to aid the IP in optimizing his/her choice of the target coverage area. Furthermore, the system may make recommendations for optimal settings of the various filters based on gathered statistics, and the IP may opt to allow automatic selections by the system with limited IP intervention.

Figure 4:
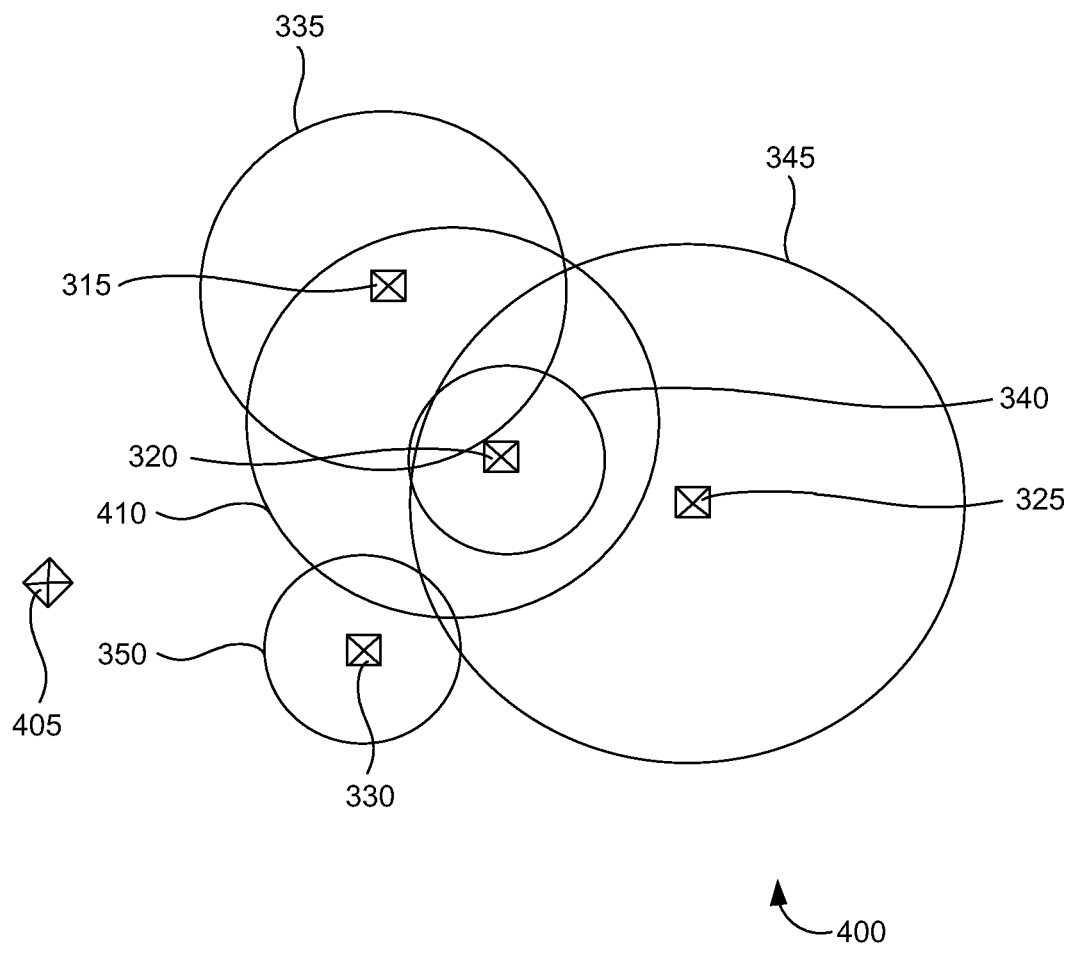
FIG. 4 is a mapping diagram of a second embodiment of the present invention illustrating potential overlaps between the criteria specified by an information producer and various potential information consumers.

FIG. 4 is a mapping diagram 400 of a second embodiment of the present invention illustrating potential overlaps between the criteria specified by an IP and various potential ICs. In this example, IP's information location is provided and it is positioned outside the target coverage area, FIG. 4 shows an example where IP 405, such as a rural hotel, is physically located outside of the geographical region 410 which IP 405 targets using the geographical filter for its information broadcast of a special discount on 2-course lunch today. In this example, the announcement refers to the IP's own location 405 since the ICs' will have to travel to IP 405's location to redeem the offer, hence it has been specified as part of the announcement information broadcast.

In this example, none of the ICs (who are assumed to be looking for food offers) are provided the IP's information. This is true for IC 315 too, even though it is physically boated within IP's target coverage area 410 and has its time filter set to today. This is because the announcement's location 405 now also becomes part of the 2-way geographic filtering process, and since location 405 lies outside the regions of interest of the various information consumers (e.g., how far they are willing to travel for lunch), the information is not made visible to any of them. Table 6 summarizes the results of FIG. 4.

TABLE 6

| | Located within IP's target area 410? | Information position 405 within IC's search area? | Meets 2-way geographical filter? | IP's timeframe | IC's timeframe | Meets 2-way timeframe filter? | Visible? |
|---|---|---|---|---|---|---|---|
| IC 315 | Yes | No | No | Today | Today | Yes | No |
| IC 320 | Yes | No | No | Today | Not today | No | No |
| IC 325 | No | No | No | Today | Today | Yes | No |
| IC 330 | No | No | No | Today | Today | Yes | No |

ICs' optionally may not specify a region of interest (i.e., no search area), in which case the system assumes all-inclusive search area filter (or a suitable default, such as the same country as the IC). An all-inclusive search area filter represents a degenerate case (analogous to a one-way filter).

Figure 5:
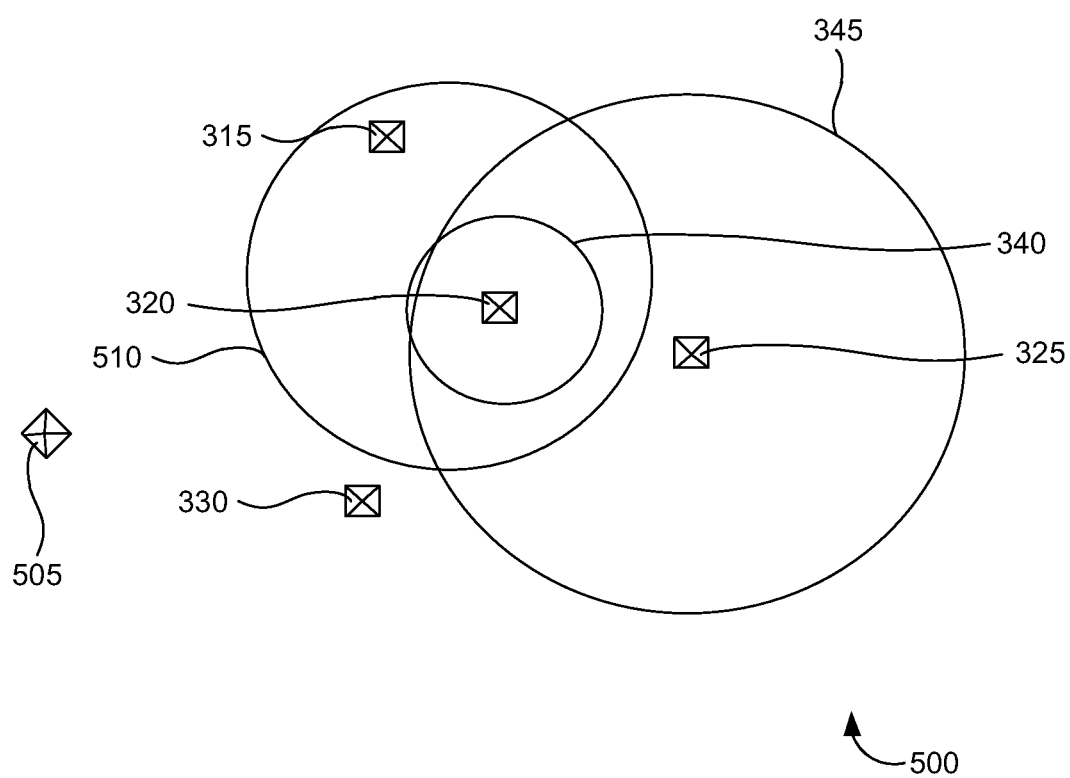
FIG. 5 is a mapping diagram of a third embodiment of the present invention illustrating potential overlaps between the criteria specified by an information producer and various potential information consumers.

FIG. 5 is a mapping diagram 500 of a third embodiment of the present invention illustrating potential overlaps between the criteria specified by an IP and various potential ICs. In FIG. 5, positional information regarding the IP is provided, the positional information is positioned outside IP 505's target coverage area and it is set to reflect IP 505's own location. FIG. 5 is a slight variation of the scenario illustrated in FIG. 4, wherein IC 315 and IC 330 do not specify a region of interest at all. Therefore IC 315 is able to see the IP 505's information as IC 315 is within the region specified by IP 505 and IC 315 did not specify a region of interest at all and is therefore given all-inclusive search area. However IC 330 is still unable to see this information since IC 330 does not fall within the IP 505's target coverage area of 510. Table 7 summarizes the results of FIG. 5.

TABLE 7

| | Located within IP's target area 510? | Information position 505 within IC's search area? | Meets 2-way geographical filter? | IP's timeframe | IC's timeframe | Meets 2-way timeframe filter? | Visible? |
|---|---|---|---|---|---|---|---|
| IC 315 | Yes | Yes | Yes | Today | Today | Yes | Yes |
| IC 320 | Yes | No | No | Today | Not today | No | No |
| IC 325 | No | No | No | Today | Today | Yes | No |
| IC 330 | No | Yes | No | Today | Today | Yes | No |

Figure 6:
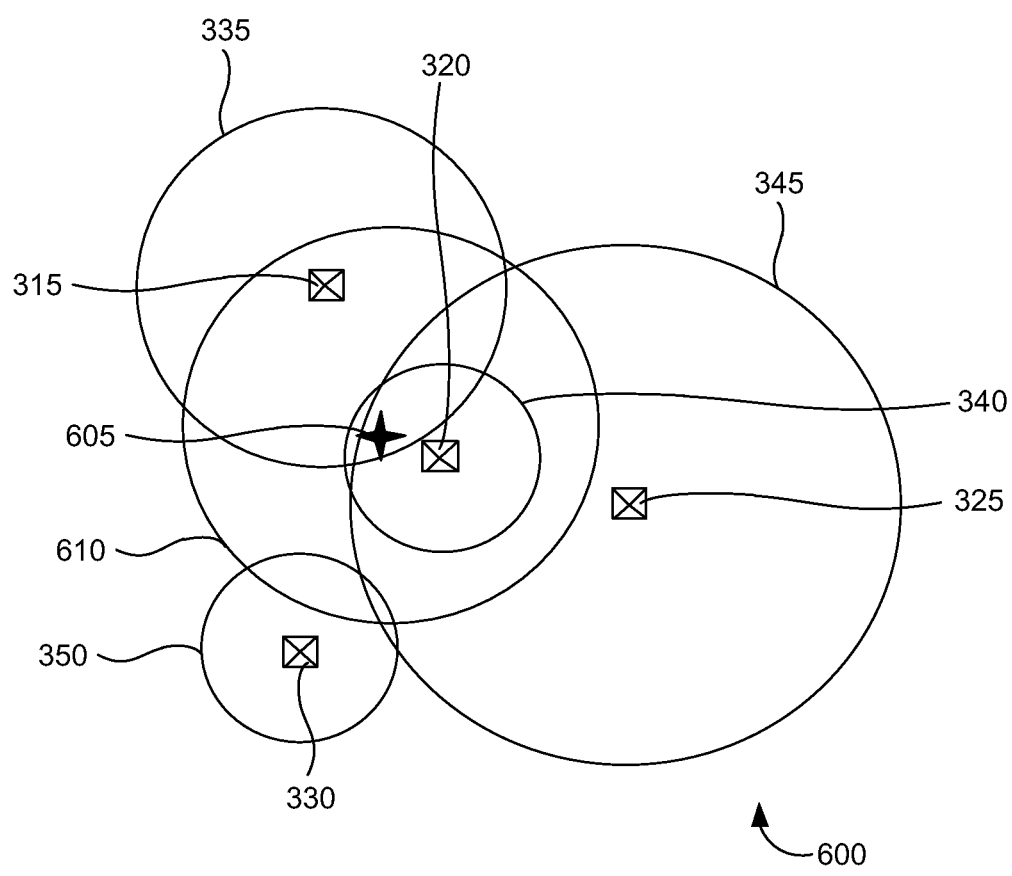
FIG. 6 is a mapping diagram of a fourth embodiment of the present invention illustrating potential overlaps between the criteria specified by an information producer and various potential information consumers.

FIG. 6 is a mapping diagram 600 of a fourth embodiment of the present invention illustrating potential overlaps between the criteria specified by an IP and various potential ICs. FIG. 6 shows an example where the information location is given as 605 for an event running today which has been organized by the IP (an events organizer) whose own business location has not been specified for the announcement as it is irrelevant. This example assumes that all the ICs are searching for things to do within theft respective regions of interest. Only IC 315 is able to see the IP's information. Table 8 summarizes the results of FIG. 6.

TABLE 8

| | Located within IP's target area 610? | Information position 605 within IC's search area? | Meets 2-way geographical filter? | IP's timeframe | IC's timeframe | Meets 2-way timeframe filter? | Visible? |
|---|---|---|---|---|---|---|---|
| IC 315 | Yes | Yes | Yes | Today | Today | Yes | Yes |
| IC 320 | Yes | Yes | Yes | Today | Not today | No | No |
| IC 325 | No | Yes | No | Today | Today | Yes | No |
| IC 330 | No | No | No | Today | Today | Yes | No |

Figure 7:
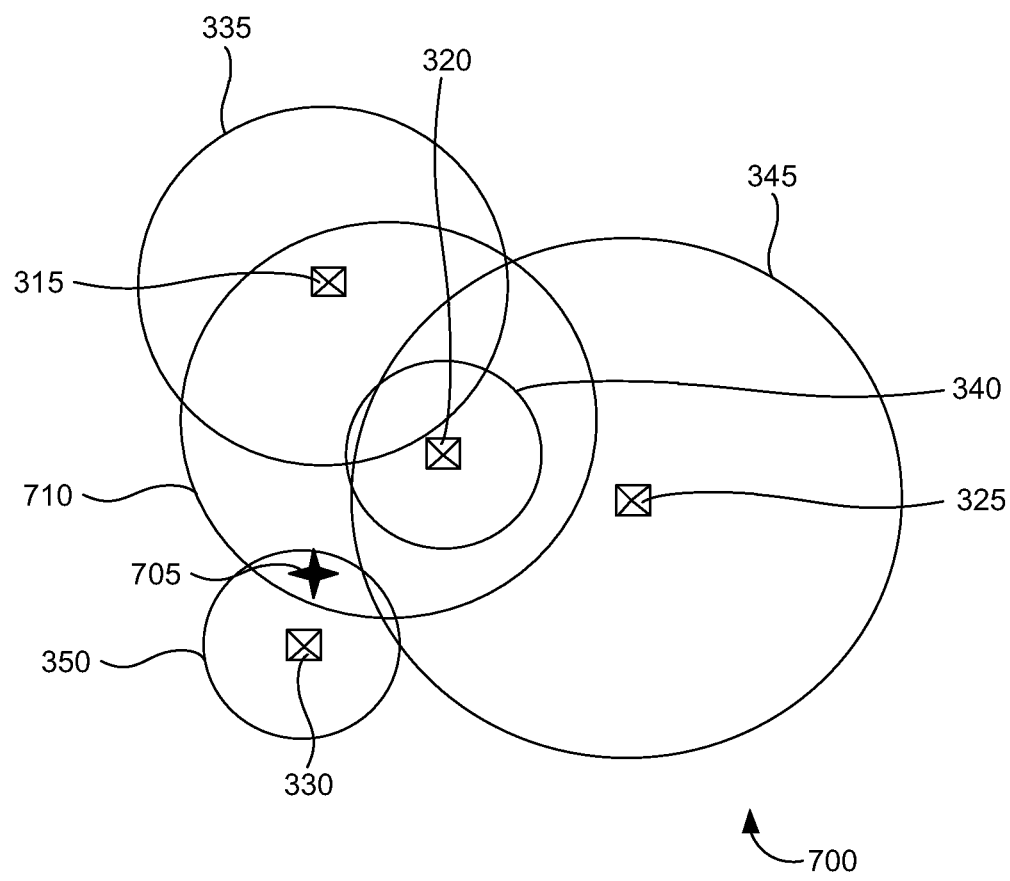
FIG. 7 is mapping diagram of a fifth embodiment of the present invention illustrating potential overlaps between the criteria specified by an information producer and various potential information consumers.

FIG. 7 is a mapping diagram 700 of a fifth embodiment of the present invention illustrating potential overlaps between the criteria specified by an IP and various potential ICs. FIG. 7 is a slight variation of the scenario illustrated in FIG. 6, in that the anticipated location of information 705 has been moved to a region still within IP's target coverage area of 710, but outside most of the regions set by IC's own filters (i.e., search areas 335, 340 and 345). This results in none of the ICs 315-330 being able to see IP's information, as the information's anticipated location does not reside within the regions 335-345 set by the filters of ICs 315-325, while IC 330 was not targeted by IP for this announcement even though 705 does fall within its search area 350. Table 9 summarizes the results of FIG. 7.

TABLE 9

|  | Located within IP's target area 710? | Information position 705 within IC's search area? | Meets 2-way geographical filter? | IP's timeframe | IC's timeframe | Meets 2-way timeframe filter? | Visible? |
|---|---|---|---|---|---|---|---|
| IC 315 | Yes | No | No | Today | Today | Yes | No |
| IC 320 | Yes | No | No | Today | Not today | No | No |
| IC 325 | No | No | No | Today | Today | Yes | No |
| IC 330 | No | Yes | No | Today | Today | Yes | No |

Figure 8:
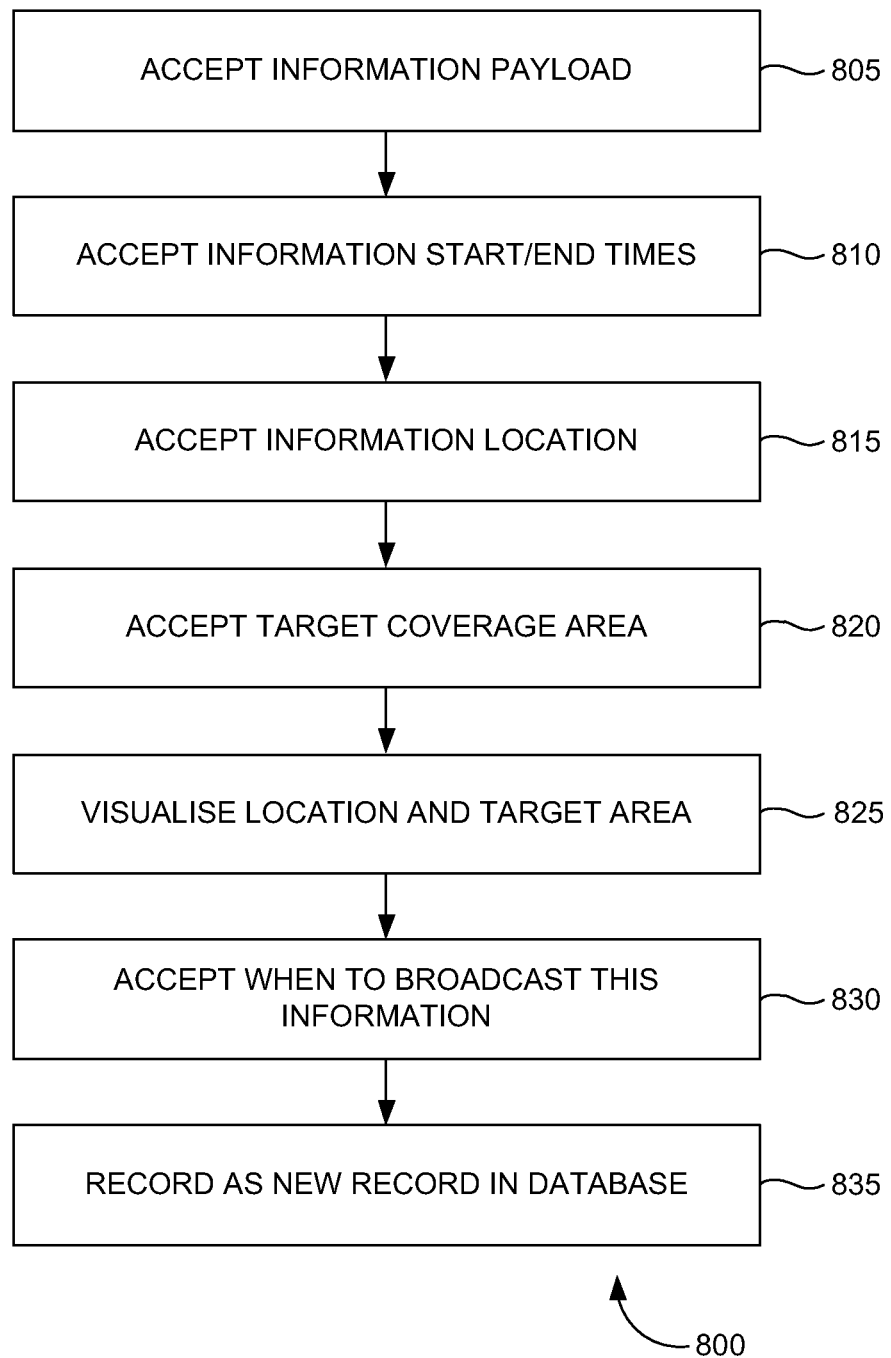
FIG. 8 is a flow chart illustrating one method of implementing the present invention for registering information from an IP to the system.

FIG. 8 is a flow chart 800 illustrating one method of implementing the present invention for registering the information to broadcast on to the system. The present invention is not limited to this specific method of implementation and encompasses similar and equivalent methods of implementation. In Step 805 the IP enters the announcement information, such as type of announcement (e.g. whether it is a one-off announcement or a recurring announcement), description of announcement, any terms and conditions, etc. Alternatively, the IP may use a look-up table to find and use one of their previously defined announcements or use an announcement template filled with some predefined data. Any information entered may be stored in a database as it is entered, or deferred until later.

In Step 810, the IP enters the day(s) and time(s) for when the announcement applies to. The IP may specify one or multiple days and times. Again, these days and times may be taken from a template or manually entered. Additionally, the IP may specify (or take from template the default values) any specific location to which the announcement applies to, if relevant, in Step 815.

In Step 820, the system can recommend a sensible target coverage area based on gathered statistics for the type of announcement, applicable times, and/or information position, if given, in previous steps, as well as take into account any budget constraints, if specified. Alternatively the IP may directly specify the target coverage area or areas of interest or instead use the default areas from a template. The IP may augment their filtering choice of a target coverage area by further filtering criteria of things such as consumer types and/or specific consumer IDs, if available. The IP may then optionally visualize the target coverage areas and information location on an interface which may include a map, and modify their choices as they see fit, in Step 825.

The IP may either manually specify the date and time when they wish to make their announcement information go "live" for broadcast and be available for searches by the information consumers, or the system may alternatively choose a day and time automatically, in Step 830. Finally in Step 835, the announcement may be fully committed to the database, and any appropriate actions taken according to filtering criteria set.

There are a number of different ways the applicable system may be implemented, for example, with step ordering re-arranged, steps combined, steps omitted, steps automated and/or information fed through means other than directly by the IP. Each of these ways, whether specifically described herein or not, are included within the present invention. For example, and without limitation, the system could source data from third party sources for display to the information consumers.

Figure 9:
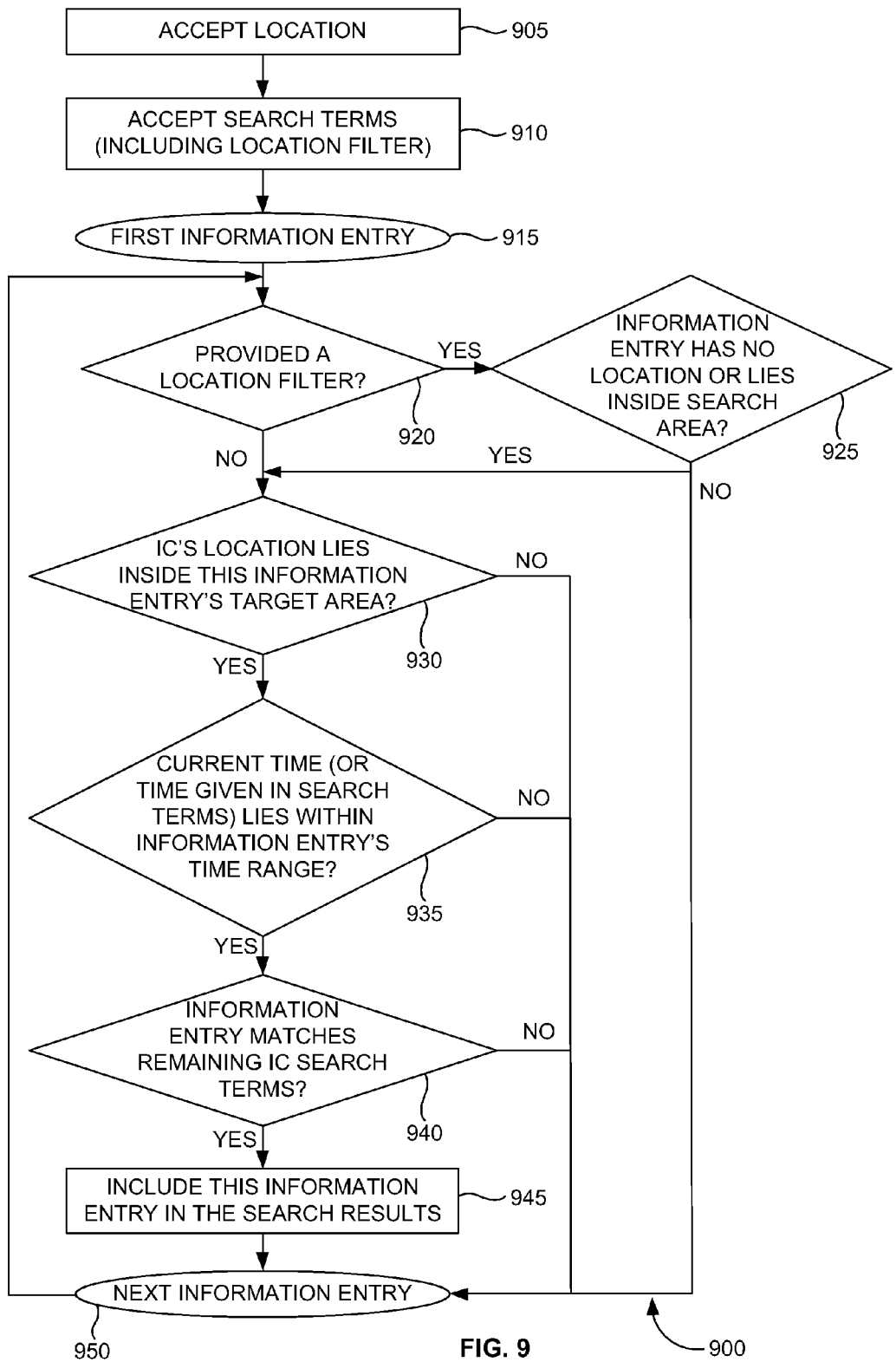
FIG. 9 is a flow chart illustrating one method of implementing the present invention for performing a search against the system.

FIG. 9 is a flow chart 900 illustrating one method of implementing the present invention for performing searches against the system by an information consumer (IC). The present invention is not limited to this specific method of implementation and encompasses similar and equivalent methods of implementation. In Step 905, the system accepts a location for the IC's position, either through manual entry by the IC or through some automated means, for example, using HTML5's geolocation or previously saved location information if a consumer ID is given.

In Step 910, the system accepts search terms which have either been specified manually by the IC or automatically through previously saved search queries, for example. The search terms may also specify a search area. This search area may be in IC's vicinity or it may be completely different from where the IC is currently located. If the search area is completely different from where the IC is currently located, the system may automatically determine a new virtual location for the IC based on the specified search area, and substitute IC's actual location with this new one for the search query.

Steps 915-950 show a loop iterating over all the information entries (provided by IPs) currently present in the system at the time of the search. The goal of the loop is to filter out entries, leaving just those which match the combination of the IC's location, IC's search query, and requirements set for each information entry by its corresponding IP. The resulting matches would be displayed to the IC in a suitable user interface in the form of a calendar, for instance, and possibly including a visualization in the form of a map.

The relevant information made available to the ICs may include, but is not limited to, the products and/or services offered by the IP, the dates and/or times when the information or announcement applies to, and if appropriate, instructions on how to redeem the given offer.

Figure 10:
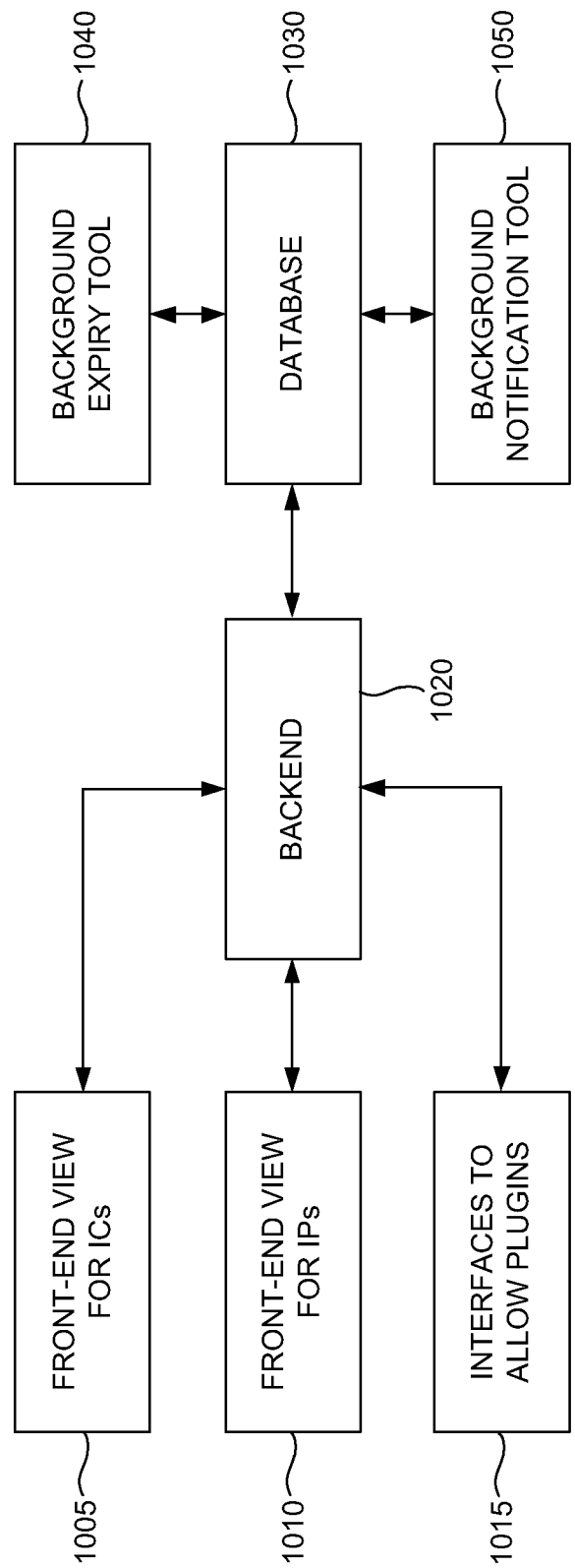
FIG. 10 shows a block diagram of one system for the present invention.

FIG. 10 shows a block diagram 1000 of the present invention. The system may include multiple front-end views, such as a view for information consumers 1005, a view for information producers 1010 and a view for allowing the plug-in of external automated data entry systems 1015. It may also include a backend 1020, a database 1030, a Background Expiry Tool 1040 and a Background Notification Tool 1050.

The front-end views 1005, 1010 and 1015 may be in the form of a website interface, or an application for running on mobile devices, for example. These front-end's main purpose is to collate and disseminate information. The front-end view for ICs 1005 presents the information consumers an interface through which they may search and/or view information. The front-end view for IPs 1010 allows information producers to manually create, amend or delete their information for broadcast into the system. Interface to allow plug-ins 1015 view provides programming interfaces through which external systems may be plugged into the system to allow automated data entry or further data dissemination. These front-ends views may utilize automated means of location detection, such as HTML5's geolocation or Internet Protocol addresses.

Backend Tool 1020 may accept new information entries from information producers (whether manual or automated) and search queries from information consumers, process the input, deriving equivalents where appropriate, communicating with Database 1030, and displaying any information and/or giving feedback as appropriate.

Database 1030 may contain information submitted by the IPs pertaining to their announcement broadcasts. This may include, but is not limited to, information regarding the duration of announcement, description of announcement, target coverage area, consumer IDs, consumer types, announcement location, IP location, etc. Database 1030 may also contain predefined or default values for different types of announcements. Database 1030 may also contain information about the information consumers, such as consumer ID, consumer type, consumer location, consumer saved search queries, consumer notification preferences, etc.

Background Expiry Tool 1040 uses the information contained in Database 830 to determine expired information and removes from database if appropriate.

Background Notification Tool 1050 uses the information contained in Database 830 to watch for new information entries. One way this may be achieved is by frequently polling the Database 830. Once a new announcement is posted on to the system and detected by the Background Notification Tool 1050, the tool may automatically notify ICs of any new matches to their previously saved searches by means of sending out an automatic notification to them, such as an e-mail or text message alerts.

Unless defined otherwise, all technical terms used herein have the same meaning as commonly understood by one of ordinary skill in the art to which this invention belongs. Any methods and materials similar or equivalent to those described herein also can be used in the practice or testing of the present disclosure.

While the present disclosure has been described with reference to the specific embodiments and examples thereof, it should be understood by those skilled in the art that various changes may be made and equivalents may be substituted without departing from the true spirit and scope of the invention. In addition, many modifications may be made to adopt a particular situation, material, composition of matter, process, process step or steps, to the objective spirit and scope of the present disclosure. All such modifications are intended to be within the scope of the claims appended hereto.

What is claimed is:

1. A method of presenting relevant marketing information to a subset of information consumers comprising the steps of:
   determining the marketing information to broadcast;
   determining at least one instance of any location concept to represent a target coverage area thereby identifying said subset of information consumers;
   overlaying said location concept on to a map;
   determining a period of time the marketing information applies to;
   saving the marketing information, the period of time and the criteria used for identification of the subset of information consumers in a database;
   determining a location for the information consumer;
   determining a time range of interest of said information consumers;
   matching by the processor together the information consumer's location with the criteria stored for the identification of the subset of information consumers;
   matching by the processor together the time range of interest of the information consumer against the period of time of the marketing information broadcast; and
   a method of presenting at least a subset of said relevant marketing information to said information consumer as a result of said matching.

2. The method of claim 1 further including the step of using additional forms of demographics to further refine the subset of information consumers in the targeted coverage area.

3. The method of claim 1 wherein said location concept includes at least one of postcode, zip code, street, area, city, county, state, country, radius and coordinates.

4. The method of claim 1 further including determining a location for an announcement wherein the location for the announcement includes at least one instance of a location concept.

5. The method of claim 1 further including determining a search area of interest wherein said search area of interest is determined from at least one of postcode, zip code, street, area, city, county, state, country, radius and coordinates.

6. The method of claim 5 wherein an extent of the search area of interest is identified by means of being overlaid on to a map.

7. The method of claim 1 wherein said location for the information consumer is determined by at least one of postcode, zip code, street, area, city, country, state, country, radius and coordinates.

8. The method of claim 1 wherein the methods to identify the location for the information consumer and to identify said subset of information consumers are different.

9. The method of claim 1 further including the step of updating the database to include data pertaining to the information consumer.

10. The method of claim 1, further including:
    determining marketing information of interest to the information consumer; and,
    matching by a processor together said marketing information to broadcast with said marketing information of interest to the information consumer.

11. The method of claim 1 wherein said target coverage area includes geographic areas which are not adjacent to each oilier.

12. The method of claim 1, further including:
    means to automatically determine, the location of at least one information consumer.

13. The method of claim 1, further including:
    determining a duration for the information broadcast; and
    limiting the duration for the information broadcast to the determined duration.

14. A system to perform two-way filtering of marketing data comprising:
    a processor programmed to provide a frontend view permitting an information consumer to search for marketing information of interest at a specific location;
    said processor programmed to provide a frontend view permitting an information producer to provide marketing information to broadcast wherein said marketing information includes at least a target coverage area and a period of time for which the marketing information applies to;

said processor programmed to provide a front-end view permitting the overlay of the target coverage area on to a map;

said processor programmed to perform a comparison between said specific location of the information consumer and said target coverage area of said information producer;

said processor programmed to further perform a comparison between the time range of interest of the information consumer against the time range of the marketing information;

said processor programmed to provide a backend to match the search for marketing information received from the information consumer with the relevant marketing information provided by the information producer;

a database for recording marketing information provided by the information producer including said target coverage area and the period of time to which the marketing information applies to;

wherein the backend provides marketing information pertaining to the information producer to the information consumer in response to at least one match of the marketing information and wherein the comparison between the specific location and the target coverage area are favorable.

15. The system of claim 14 further inducting said processor is programmed to provide at least one frontend view to allow external systems to retrieve data from the system.

16. The system of claim 14 further including said processor is programmed to provide at least one icon tend view to allow external systems to feed data into the system.

17. The system of claim 14 wherein said processor is programmed to provide automatic notifications which are broadcast to information consumers once a match to one of their previously saved search queries occurs through the posting of a new announcement on the system.

18. The system of claim 14 wherein said broadcast information includes at least one of target times for the broadcast, times associated with the broadcast, and intended recipients of the broadcast.

* * * * *